US011662568B2

(12) United States Patent
Kaminski et al.

(10) Patent No.: US 11,662,568 B2
(45) Date of Patent: May 30, 2023

(54) LIQUID LENSES AND METHODS FOR OPERATING LIQUID LENSES

(71) Applicant: CORNING INCORPORATED, Corning, NY (US)

(72) Inventors: Jann Paul Kaminski, Santa Barbara, CA (US); Raymond Miller Karam, Santa Barbara, CA (US); Ian Armour McKay, Mountain View, CA (US); Dragan Pikula, Horseheads, NY (US); Thomas M Wynne, Santa Barbara, CA (US)

(73) Assignee: Corning Incorporated, Corning, NY (US)

( * ) Notice: Subject to any disclaimer, the term of this patent is extended or adjusted under 35 U.S.C. 154(b) by 444 days.

(21) Appl. No.: 16/762,411

(22) PCT Filed: Nov. 14, 2018

(86) PCT No.: PCT/US2018/060884
§ 371 (c)(1),
(2) Date: May 7, 2020

(87) PCT Pub. No.: WO2019/099430
PCT Pub. Date: May 23, 2019

(65) Prior Publication Data
US 2020/0271917 A1  Aug. 27, 2020

Related U.S. Application Data

(60) Provisional application No. 62/585,964, filed on Nov. 14, 2017.

(51) Int. Cl.
G02B 3/12 (2006.01)
G02B 26/00 (2006.01)
(Continued)

(52) U.S. Cl.
CPC ............. *G02B 26/005* (2013.01); *G02B 3/14* (2013.01); *G02B 7/028* (2013.01)

(58) Field of Classification Search
CPC ........... G02B 3/12; G02B 3/14; G02B 26/005
See application file for complete search history.

(56) References Cited

U.S. PATENT DOCUMENTS 9,109,876 B2  8/2015  De Boer et al.
2002/0176148 A1  11/2002  Onuki et al.
(Continued)

FOREIGN PATENT DOCUMENTS

CN  1841095 A   10/2006
CN  101421660 A  4/2009
(Continued)

OTHER PUBLICATIONS

Chinese Patent Application No. 201811353254.6, Office Action, dated Jun. 7, 2022, 5 pages, Chinese Patent Office.
(Continued)

*Primary Examiner* — Joseph P Martinez
(74) *Attorney, Agent, or Firm* — Tamika A. Crawl-Bey

(57) ABSTRACT

A liquid lens system includes first and second liquids disposed within a cavity. An interface between the first and second liquids defines a variable lens. A common electrode is in electrical communication with the first liquid. A driving electrode is disposed on a sidewall of the cavity and insulated from the first and second liquids. A controller supplies a common voltage to the common electrode and a driving voltage to the driving electrode. A voltage differential between the common voltage and the driving voltage is based at least in part on at least one of: (a) a first reference capacitance of a first reference electrode pair disposed within the first portion of the cavity and insulated from the first liquid or (b) a second reference capacitance of a second
(Continued)

reference electrode pair disposed within the second portion of the cavity and insulated from the first liquid and the second liquid.

13 Claims, 5 Drawing Sheets

(51) Int. Cl.
*G02B 3/14* (2006.01)
*G02B 7/02* (2021.01)

(56) References Cited

U.S. PATENT DOCUMENTS

| 2008/0144186 A1* | 6/2008 | Feng | G02B 3/02 |
| | | | 359/666 |
| 2008/0239450 A1 | 10/2008 | Immink et al. | |
| 2009/0135484 A1 | 5/2009 | Weber et al. | |
| 2017/0315274 A1 | 11/2017 | Park et al. | |
| 2018/0292725 A1 | 10/2018 | Moon et al. | |

FOREIGN PATENT DOCUMENTS

| CN | 103607942 A | | 2/2014 | |
| CN | 209674101 U | | 11/2019 | |
| WO | 2005/096034 A1 | | 10/2005 | |
| WO | WO2005096034 | * | 10/2005 | ............... G02B 3/14 |
| WO | 2010/061300 A1 | | 6/2010 | |

OTHER PUBLICATIONS

International Search Report and Written Opinion of the International Searching Authority; PCT/US2018/060884; dated Feb. 21, 2019; 12 Pages; European Patent Office.

* cited by examiner

LIQUID LENSES AND METHODS FOR OPERATING LIQUID LENSES

CROSS-REFERENCE TO RELATED APPLICATIONS

This application claims the benefit of priority under 35 U.S.C. § 371 of International Application No. PCT/US2018/060884, filed Nov. 14, 2018, which claims the benefit of priority under 35 U.S.C. § 119 of U.S. Provisional Application No. 62/585,964, filed Nov. 14, 2017, the content of each of which is incorporated herein by reference in its entirety.

BACKGROUND

1. Field

This disclosure relates to liquid lenses and methods for operating liquid lenses.

2. Technical Background

Liquid lenses generally include two immiscible liquids disposed within a chamber. Varying the electric field to which the liquids are subjected can vary the wettability of one of the liquids with respect to the chamber wall, thereby varying the shape of the meniscus formed between the two liquids.

SUMMARY

Disclosed herein are liquid lenses and methods for operating liquid lenses.

Disclosed herein is a liquid lens system comprising a first window, a second window, and a cavity disposed between the first window and the second window. A first liquid and a second liquid are disposed within the cavity. The first liquid and the second liquid are substantially immiscible with each other and have different refractive indices such that an interface between the first liquid and the second liquid defines a variable lens. At least a portion of the first liquid is disposed within a first portion of the cavity. The second liquid is disposed within a second portion of the cavity. A common electrode is in electrical communication with the first liquid. A driving electrode is disposed on a sidewall of the cavity and insulated from the first liquid and the second liquid. A controller is configured to supply a common voltage to the common electrode and a driving voltage to the driving electrode. A voltage differential between the common voltage and the driving voltage is based at least in part on at least one of: (a) a first reference capacitance of a first reference electrode pair disposed within the first portion of the cavity and insulated from the first liquid or (b) a second reference capacitance of a second reference electrode pair disposed within the second portion of the cavity and insulated from the first liquid and the second liquid.

Disclosed herein is a method of operating a liquid lens, the method comprising supplying a common voltage to a common electrode in electrical communication with a first liquid. The first liquid and a second liquid are disposed within a cavity, substantially immiscible with each other, and have different refractive indices such that an interface between the first liquid and the second liquid defines a variable lens. At least a portion of the first liquid is disposed within a first portion of the cavity. The second liquid is disposed within a second portion of the cavity. A driving voltage is supplied to a driving electrode disposed on a sidewall of the cavity. A first reference voltage is supplied to each of a first reference electrode of a first reference electrode pair and a second reference electrode of the first reference electrode pair. The first reference electrode pair is disposed within the first portion of the cavity and insulated from the first liquid. The first reference voltage supplied to the first reference electrode of the first reference electrode pair is substantially the same as the first reference voltage supplied to the second reference electrode of the first reference electrode pair. A second reference voltage is supplied to each of a first reference electrode of a second reference electrode pair and a second reference electrode of the second reference electrode pair. The second reference electrode pair is disposed within the second portion of the cavity and insulated from the first liquid and the second liquid. The second reference voltage supplied to the first reference electrode of the second reference electrode pair is substantially the same as the second reference voltage supplied to the second reference electrode of the second reference electrode pair. A first reference capacitance between the first reference electrode of the first reference electrode pair and the second reference electrode of the first reference electrode pair is determined. A second reference capacitance between the first reference electrode of the second reference electrode pair and the second reference electrode of the second reference electrode pair is determined. A voltage differential between the common voltage and the driving voltage is adjusted based at least in part on (a) the first reference capacitance and (b) the second reference capacitance.

It is to be understood that both the foregoing general description and the following detailed description are merely exemplary, and are intended to provide an overview or framework to understanding the nature and character of the claimed subject matter. The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Figure 1:
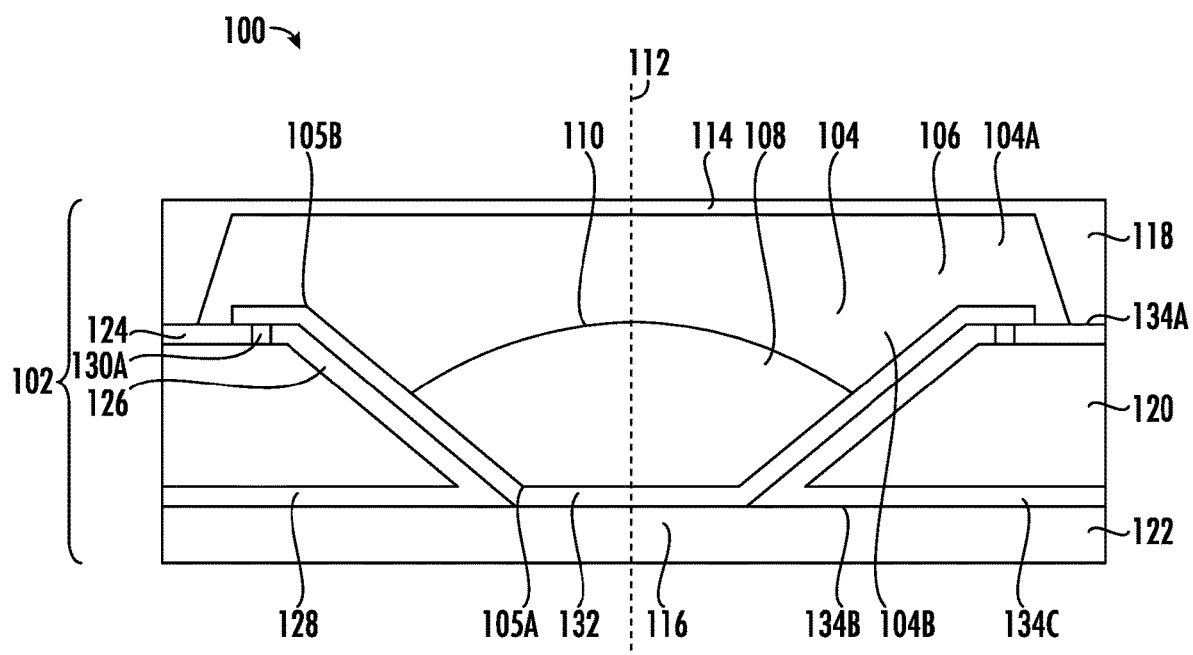
FIG. 1 is a schematic cross-sectional view of some embodiments of a liquid lens.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

Numerical values, including endpoints of ranges, can be expressed herein as approximations preceded by the term "about," "approximately," or the like. In such cases, other embodiments include the particular numerical values. Regardless of whether a numerical value is expressed as an approximation, two embodiments are included in this disclosure: one expressed as an approximation, and another not expressed as an approximation. It will be further understood that an endpoint of each range is significant both in relation to another endpoint, and independently of another endpoint.

In various embodiments, a liquid lens system comprises a first window, a second window, and a cavity disposed between the first window and the second window. A first liquid and a second liquid are disposed within the cavity. The first liquid and the second liquid are substantially immiscible with each other and have different refractive indices such that an interface between the first liquid and the second liquid defines a variable lens. In some embodiments, at least a portion of the first liquid is disposed within a first portion, or a headspace, of the cavity. Additionally, or alternatively, the second liquid is disposed in a second portion, or a base portion, of the cavity. A common electrode is in electrical communication with the first liquid, and a driving electrode is disposed on a sidewall of the cavity and insulated from the first liquid and the second liquid. In some embodiments, a controller is configured to supply a common voltage to the common electrode and a driving voltage to the driving electrode. In some embodiments, a voltage differential between the common voltage and the driving voltage is based at least in part on at least one of (a) a first reference capacitance of a first reference electrode pair disposed within the first portion of the cavity and insulated from the first liquid or (b) a second reference capacitance of a second reference electrode pair disposed within the second portion of the cavity and insulated from the first liquid and the second liquid. Additionally, or alternatively, the voltage differential between the common voltage and the driving voltage is based at least in part on (c) a capacitance between the first liquid and the driving electrode and/or (d) a temperature within the cavity.

The capacitance between the first liquid and the driving electrode can be indicative of a position of the fluid interface on the sidewall of the cavity. In some embodiments, the liquid lens is controlled using a closed loop control scheme in which the voltage differential between the common voltage and the driving voltage is the manipulated variable and the capacitance between the first liquid and the driving electrode is the measured variable. Thus, the voltage differential can be controlled to move the fluid interface to a desired position on the sidewall of the cavity, thereby controlling the focus (e.g., diopter and/or tilt) of the liquid lens. During operation of the liquid lens, the properties of the liquid lens can change. For example, the dielectric properties of the liquids and/or the insulating materials can change in response to exposure to the voltage differential over time, changes in temperature, or other factors. Thus, the relationship between the capacitance between the first liquid and the driving electrode and the position of the fluid interface on the sidewall of the cavity also can change. Use of reference capacitance as described herein can compensate for the changing dielectric properties of the liquid lens to maintain desired control over the fluid interface.

FIG. 1 is a schematic cross-sectional view of some embodiments of a liquid lens 100. In some embodiments, liquid lens 100 comprises a lens body 102 and a cavity 104 formed in the lens body. A first liquid 106 and a second liquid 108 are disposed within cavity 104. In some embodiments, first liquid 106 is a polar liquid or a conducting liquid. Additionally, or alternatively, second liquid 108 is a non-polar liquid or an insulating liquid. In some embodiments, first liquid 106 and second liquid 108 are immiscible with each other and have different refractive indices such that an interface 110 between the first liquid and the second liquid forms a lens. In some embodiments, first liquid 106 and second liquid 108 have substantially the same density, which can help to avoid changes in the shape of interface 110 as a result of changing the physical orientation of liquid lens 100 (e.g., as a result of gravitational forces).

In some embodiments, cavity 104 comprises a first portion, or headspace, 104A and a second portion, or base portion, 104B. For example, second portion 104B of cavity 104 is defined by a bore in an intermediate layer of liquid lens 100 as described herein. Additionally, or alternatively, first portion 104A of cavity 104 is defined by a recess in a first outer layer of liquid lens 100 and/or disposed outside of the bore in the intermediate layer as described herein. In some embodiments, at least a portion of first liquid 106 is disposed in first portion 104A of cavity 104. Additionally, or alternatively, second liquid 108 is disposed within second portion 104B of cavity 104. For example, substantially all or a portion of second liquid 108 is disposed within second portion 104B of cavity 104. In some embodiments, the perimeter of interface 110 (e.g., the edge of the interface in contact with the sidewall of the cavity) is disposed within second portion 104B of cavity 104.

Interface 110 can be adjusted via electrowetting. For example, a voltage can be applied between first liquid 106 and a surface of cavity 104 (e.g., an electrode positioned near the surface of the cavity and insulated from the first liquid as described herein) to increase or decrease the wettability of the surface of the cavity with respect to the first liquid and change the shape of interface 110. In some embodiments, adjusting interface 110 changes the shape of the interface, which changes the focal length or focus of liquid lens 100. For example, such a change of focal length can enable liquid lens 100 to perform an autofocus function. Additionally, or alternatively, adjusting interface 110 tilts the interface relative to an optical axis 112 of liquid lens 100. For example, such tilting can enable liquid lens 100 to perform an optical image stabilization (OIS) function. Adjusting interface 110 can be achieved without physical movement of liquid lens 100 relative to an image sensor, a fixed lens or lens stack, a housing, or other components of a camera module in which the liquid lens can be incorporated.

In some embodiments, lens body 102 of liquid lens 100 comprises a first window 114 and a second window 116. In some of such embodiments, cavity 104 is disposed between first window 114 and second window 116. In some embodiments, lens body 102 comprises a plurality of layers that cooperatively form the lens body. For example, in the embodiments shown in FIG. 1, lens body 102 comprises a first outer layer 118, an intermediate layer 120, and a second outer layer 122. In some of such embodiments, intermediate layer 120 comprises a bore formed therethrough. First outer layer 118 can be bonded to one side (e.g., the object side) of intermediate layer 120. For example, first outer layer 118 is bonded to intermediate layer 120 at a bond 134A. Bond 134A can be an adhesive bond, a laser bond (e.g., a laser weld), or another suitable bond capable of maintaining first liquid 106 and second liquid 108 within cavity 104. Additionally, or alternatively, second outer layer 122 can be bonded to the other side (e.g., the image side) of intermediate layer 120. For example, second outer layer 122 is bonded to intermediate layer 120 at a bond 134B and/or a bond 134C, each of which can be configured as described herein with respect to bond 134A. In some embodiments, intermediate layer 120 is disposed between first outer layer 118 and second outer layer 122, the bore in the intermediate layer is covered on opposing sides by the first outer layer and the second outer layer, and at least a portion of cavity 104 is defined within the bore. Thus, a portion of first outer layer 118 covering cavity 104 serves as first window 114, and a portion of second outer layer 122 covering the cavity serves as second window 116.

In some embodiments, cavity 104 comprises first portion 104A and second portion 104B. For example, in the embodiments shown in FIG. 1, second portion 104B of cavity 104 is defined by the bore in intermediate layer 120, and first portion 104A of the cavity is disposed between the second portion of the cavity and first window 114. In some embodiments, first outer layer 118 comprises a recess as shown in FIG. 1, and first portion 104A of cavity 104 is disposed within the recess in the first outer layer. Thus, first portion 104A of cavity is disposed outside of the bore in intermediate layer 120.

In some embodiments, cavity 104 (e.g., second portion 104B of the cavity) is tapered as shown in FIG. 1 such that a cross-sectional area of the cavity decreases along optical axis 112 in a direction from the object side to the image side. For example, second portion 104B of cavity 104 comprises a narrow end 105A and a wide end 105B. The terms "narrow" and "wide" are relative terms, meaning the narrow end is narrower than the wide end. Such a tapered cavity can help to maintain alignment of interface 110 between first liquid 106 and second liquid 108 along optical axis 112. In other embodiments, the cavity is tapered such that the cross-sectional area of the cavity increases along the optical axis in the direction from the object side to the image side or non-tapered such that the cross-sectional area of the cavity remains substantially constant along the optical axis.

In some embodiments, image light enters liquid lens 100 through first window 114, is refracted at interface 110 between first liquid 106 and second liquid 108, and exits the liquid lens through second window 116. In some embodiments, first outer layer 118 and/or second outer layer 122 comprise a sufficient transparency to enable passage of the image light. For example, first outer layer 118 and/or second outer layer 122 comprise a polymeric, glass, ceramic, or glass-ceramic material. In some embodiments, outer surfaces of first outer layer 118 and/or second outer layer 122 are substantially planar. Thus, even though liquid lens 100 can function as a lens (e.g., by refracting image light passing through interface 110), outer surfaces of the liquid lens can be flat as opposed to being curved like the outer surfaces of a fixed lens. In other embodiments, outer surfaces of the first outer layer and/or the second outer layer are curved (e.g., concave or convex). Thus, the liquid lens comprises an integrated fixed lens. In some embodiments, intermediate layer 120 comprises a metallic, polymeric, glass, ceramic, or glass-ceramic material. Because image light can pass through the bore in intermediate layer 120, the intermediate layer may or may not be transparent.

Although lens body 102 of liquid lens 100 is described as comprising first outer layer 118, intermediate layer 120, and second outer layer 122, other embodiments are included in this disclosure. For example, in some other embodiments, one or more of the layers is omitted. For example, the bore in the intermediate layer can be configured as a blind hole that does not extend entirely through the intermediate layer, and the second outer layer can be omitted. Although first portion 104A of cavity 104 is described herein as being disposed within the recess in first outer layer 118, other embodiments are included in this disclosure. For example, in some other embodiments, the recess is omitted, and the first portion of the cavity is disposed within the bore in the intermediate layer. Thus, the first portion of the cavity is an upper portion of the bore, and the second portion of the cavity is a lower portion of the bore. In some other embodiments, the first portion of the cavity is disposed partially within the bore in the intermediate layer and partially outside the bore.

In some embodiments, liquid lens 100 comprises a common electrode 124 in electrical communication with first liquid 106. Additionally, or alternatively, liquid lens 100 comprises a driving electrode 126 disposed on a sidewall of cavity 104 and insulated from first liquid 106 and second liquid 108. Different voltages can be supplied to common electrode 124 and driving electrode 126 to change the shape of interface 110 as described herein.

In some embodiments, liquid lens 100 comprises a conductive layer 128 at least a portion of which is disposed within cavity 104. For example, conductive layer 128 comprises a conductive coating applied to intermediate layer 120 prior to bonding first outer layer 118 and/or second outer layer 122 to the intermediate layer. Conductive layer 128 can comprise a metallic material, a conductive polymer material, another suitable conductive material, or a combination thereof. Additionally, or alternatively, conductive layer 128 can comprise a single layer or a plurality of layers, some or all of which can be conductive. In some embodiments, conductive layer 128 defines common electrode 124 and/or driving electrode 126. For example, conductive layer 128 can be applied to substantially the entire outer surface of intermediate layer 118 prior to bonding first outer layer 118 and/or second outer layer 122 to the intermediate layer. Following application of conductive layer 128 to intermediate layer 118, the conductive layer can be segmented into various conductive elements (e.g., common electrode 124, driving electrode 126, and/or reference electrodes as described herein). In some embodiments, liquid lens 100 comprises a scribe 130A in conductive layer 128 to isolate (e.g., electrically isolate) common electrode 124 and driving electrode 126 from each other. In some embodiments, scribe 130A comprises a gap in conductive layer 128. For example, scribe 130A is a gap with a width of about 5 µm, about 10 µm, about 15 µm, about 20 µm, about 25 µm, about 30 µm, about 35 µm, about 40 µm, about 45 µm, about 50 µm, or any ranges defined by the listed values.

In some embodiments, liquid lens 100 comprises an insulating layer 132 disposed within cavity 104. For example, insulating layer 132 comprises an insulating coating applied to intermediate layer 120 prior to bonding first outer layer 118 and/or second outer layer 122 to the intermediate layer. In some embodiments, insulating layer 132 comprises an insulating coating applied to conductive layer 128 and second window 116 after bonding second outer layer 122 to intermediate layer 120 and prior to bonding first outer layer 118 to the intermediate layer. Thus, insulating layer 132 covers at least a portion of conductive layer 128 within cavity 104 and second window 116. In some embodiments, insulating layer 132 can be sufficiently transparent to enable passage of image light through second window 116 as described herein. Insulating layer 132 can comprise polytetrafluoroethylene (PTFE), parylene, another suitable polymeric or non-polymeric insulating material, or a combination thereof. Additionally, or alternatively, insulating layer 132 comprises a hydrophobic material. Additionally, or alternatively, insulating layer 132 can comprise a single layer or a plurality of layers, some or all of which can be insulating. In some embodiments, insulating layer 132 covers at least a portion of driving electrode 126 (e.g., the portion of the driving electrode disposed within cavity 104) to insulate first liquid 106 and second liquid 108 from the driving electrode. Additionally, or alternatively, at least a portion of common electrode 124 disposed within cavity 104 is uncovered by insulating layer 132. Thus, common electrode 124 can be in electrical communication with first liquid 106 as described herein. In some embodiments, insulating layer 132 comprises a hydrophobic surface layer of second portion 104B of cavity 104. Such a hydrophobic surface layer can help to maintain second liquid 108 within second portion 104B of cavity 104 (e.g., by attraction between the non-polar second liquid and the hydrophobic material) and/or enable the perimeter of interface 110 to move along the hydrophobic surface layer (e.g., by electrowetting) to change the shape of the interface as described herein.

Figure 2:
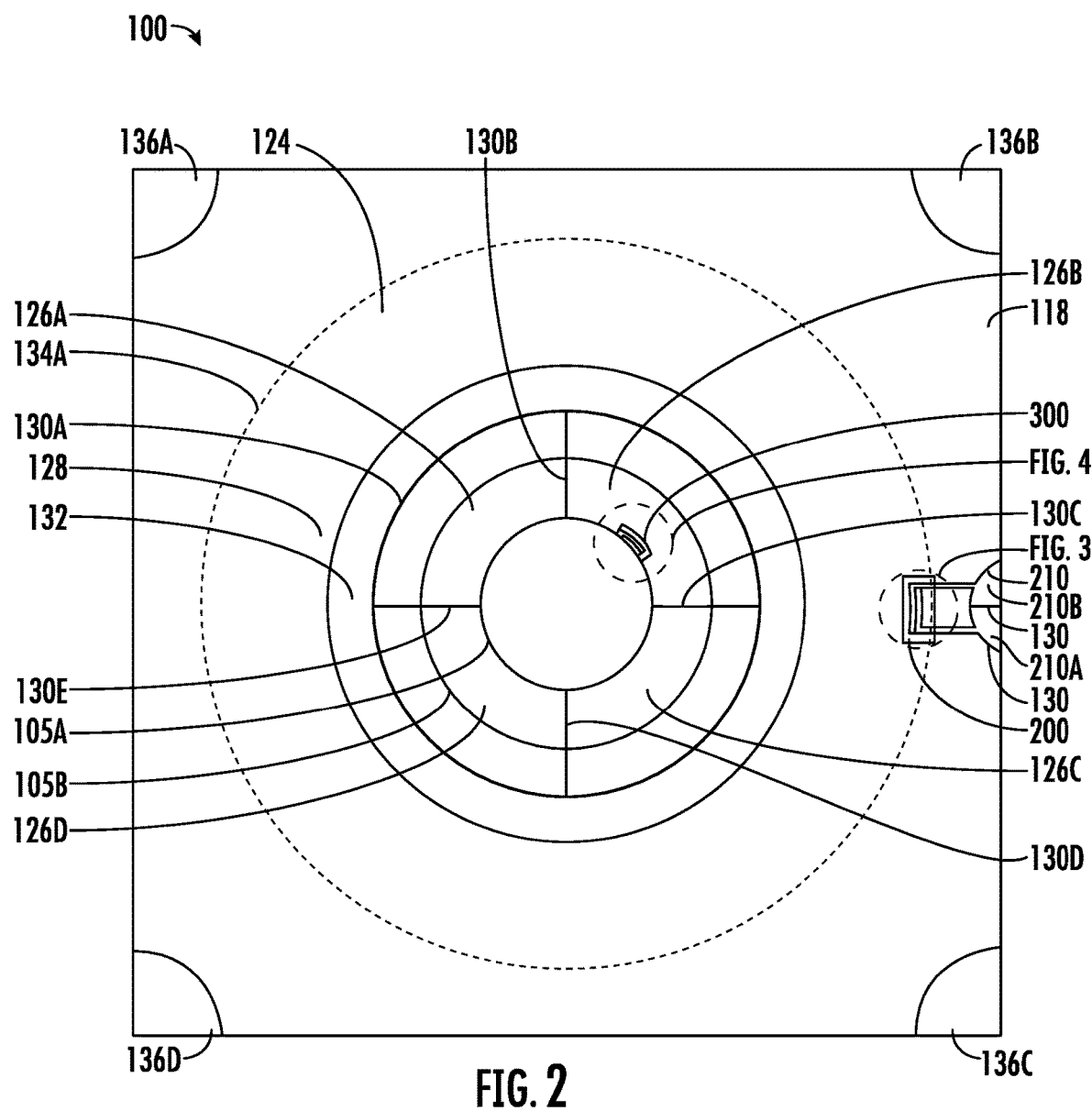
FIG. 2 is a schematic front view of the liquid lens of FIG. 1 looking through a first outer layer of the liquid lens.
Figure 3:
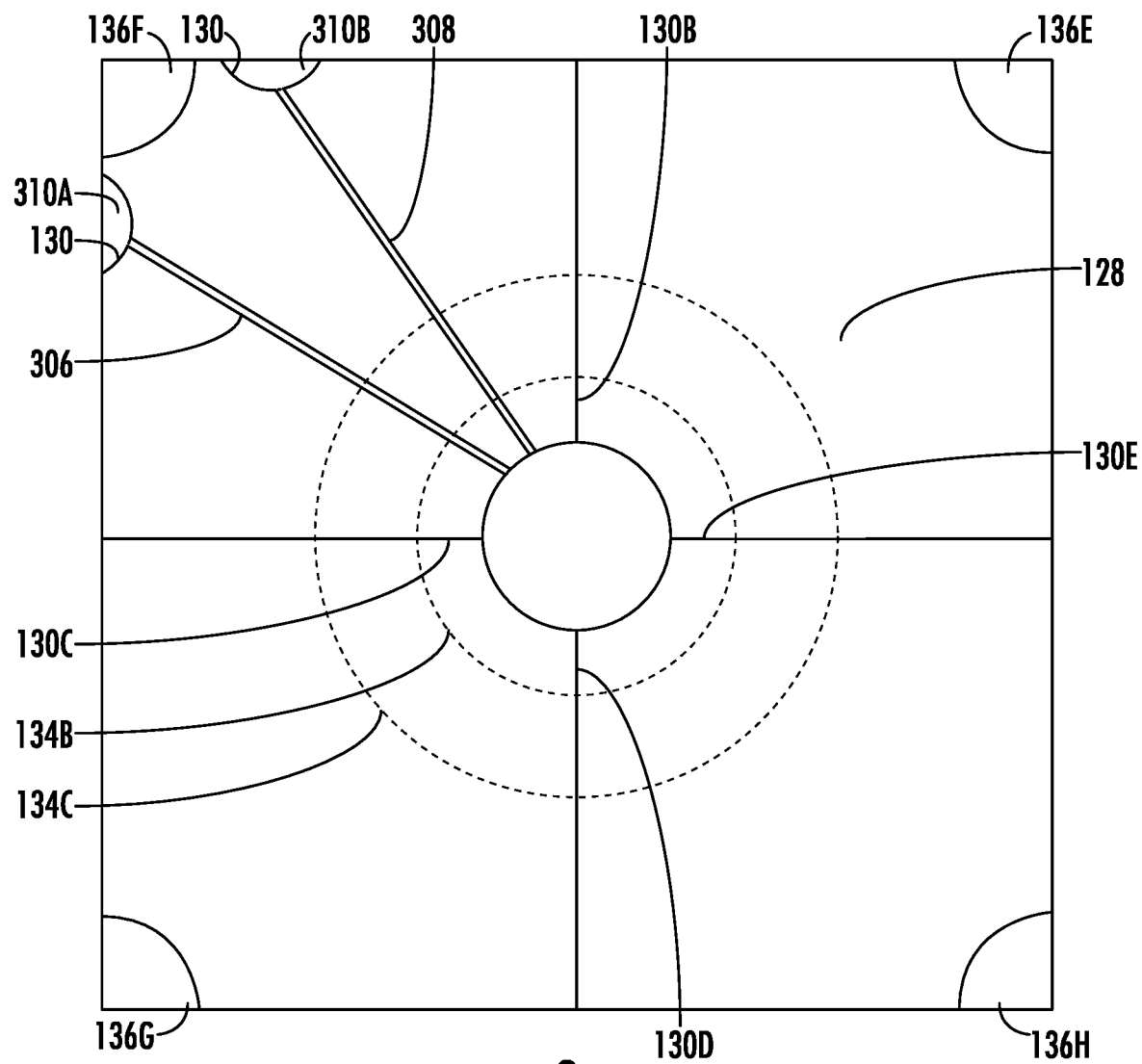
FIG. 3 is a schematic rear view of the liquid lens of FIG. 1 looking through a second outer layer of the liquid lens.

FIG. 2 is a schematic front view of liquid lens 100 looking through first outer layer 118, and FIG. 3 is a schematic rear view of the liquid lens looking through second outer layer 122. For clarity in FIGS. 2 and 3, and with some exceptions, bonds generally are shown in dashed lines, scribes generally are shown in heavier lines, and other features generally are shown in lighter lines.

In some embodiments, common electrode 124 is defined between scribe 130A and bond 134A, and a portion of the common electrode is uncovered by insulating layer 132 such that the common electrode can be in electrical communication with first liquid 106 as described herein. In some embodiments, bond 134A is configured such that electrical continuity is maintained between the portion of conductive layer 128 inside the bond (e.g., inside cavity 104) and the portion of the conductive layer outside the bond. In some embodiments, liquid lens 100 comprises one or more cutouts 136 in first outer layer 118. For example, in the embodiments shown in FIG. 2, liquid lens 100 comprises a first cutout 136A, a second cutout 136B, a third cutout 136C, and a fourth cutout 136D. In some embodiments, cutouts 136 comprise portions of liquid lens 100 at which first outer layer 118 is removed to expose conductive layer 128. Thus, cutouts 136 can enable electrical connection to common electrode 124, and the regions of conductive layer 128 exposed at cutouts 136 can serve as contacts to enable electrical connection of liquid lens 100 to a controller, a driver, or another component of a lens or camera system.

In some embodiments, driving electrode 126 comprises a plurality of driving electrode segments. For example, in the embodiments shown in FIGS. 2 and 3, driving electrode 126 comprises a first driving electrode segment 126A, a second driving electrode segment 126B, a third driving electrode segment 126C, and a fourth driving electrode segment 126D. In some embodiments, the driving electrode segments are distributed substantially uniformly about the sidewall of cavity 104. For example, each driving electrode segment occupies about one quarter, or one quadrant, of the sidewall of second portion 104B of cavity 104. In some embodiments, adjacent driving electrode segments are isolated from each other by a scribe. For example, first driving electrode segment 126A and second driving electrode segment 126B are isolated from each other by a scribe 130B. Additionally, or alternatively, second driving electrode segment 126B and third driving electrode segment 126C are isolated from each other by a scribe 130C. Additionally, or alternatively, third driving electrode segment 126C and fourth driving electrode segment 126D are isolated from each other by a scribe 130D. Additionally, or alternatively, fourth driving electrode segment 126D and first driving electrode segment 126A are isolated from each other by a scribe 130E. The various scribes 130 can be configured as described herein in reference to scribe 130A. In some embodiments, the scribes between the various electrode segments extend beyond cavity 104 and onto the back side of liquid lens 100 as shown in FIG. 3. Such a configuration can ensure electrical isolation of the adjacent driving electrode segments from each other. Additionally, or alternatively, such a configuration can enable each driving electrode segment to have a corresponding contact for electrical connection as described herein.

Although driving electrode 126 is described herein as being divided into four driving electrode segments, other embodiments are included in this disclosure. In some other embodiments, the driving electrode is divided into two, three, five, six, seven, eight, or more driving electrode segments.

In some embodiments, bond 134B and/or bond 134C are configured such that electrical continuity is maintained between the portion of conductive layer 128 inside the respective bond and the portion of the conductive layer outside the respective bond. In some embodiments, liquid lens 100 comprises one or more cutouts 136 in second outer layer 122. For example, in the embodiments shown in FIG. 3, liquid lens 100 comprises a fifth cutout 136E, a sixth cutout 136F, a seventh cutout 136G, and an eighth cutout 136H. In some embodiments, cutouts 136 comprise portions of liquid lens 100 at which second outer layer 122 is removed to expose conductive layer 128. Thus, cutouts 136 can enable electrical connection to driving electrode 126, and the regions of conductive layer 128 exposed at cutouts 136 can serve as contacts to enable electrical connection of liquid lens 100 to a controller, a driver, or another component of a lens or camera system.

Different driving voltages can be supplied to different driving electrode segments to tilt the interface of the liquid lens (e.g., for OIS functionality). Additionally, or alternatively, the same driving voltage can be supplied to each driving electrode segment to maintain the interface of the liquid lens in a substantially spherical orientation about the optical axis (e.g., for autofocus functionality).

Figure 4:
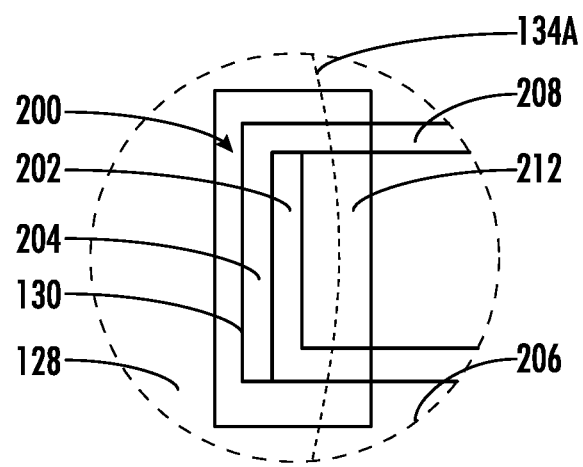
FIG. 4 is a close-up view of some embodiments of a first reference electrode pair.

In some embodiments, liquid lens 100 comprises a first reference electrode pair 200 disposed within first portion 104A of cavity 104 and insulated from first liquid 106. FIG. 4 is a close-up view of some embodiments of first reference electrode pair 200. In some embodiments, first reference electrode pair 200 comprises a first reference electrode 202 and a second reference electrode 204. For example, first reference electrode 202 and second reference electrode 204 are elongate conductive members positioned substantially parallel to each other and spaced from each other. In some embodiments, first reference electrode 202 and/or second reference electrode 204 have a width of about 10 µm, about 20 µm, about 30 µm, about 40 µm, about 50 µm, about 100 µm, about 200 µm, about 300 µm, about 400 µm, about 500 µm, about 1000 µm, or any ranges defined by the listed values. first reference electrode 202 and second reference electrode 204 can have the same or different widths.

In some embodiments, first reference electrode 202 and second reference electrode 204 are defined by one or more scribe lines 130 in conductive layer 128. For example, scribe lines 130 can be formed in common electrode 124 to serve as gaps to isolate first reference electrode 202 and second reference electrode 204 from each other and/or from common electrode 124. Thus, a portion of common electrode 124 can be isolated or carved out to form first reference electrode pair 200. A reference voltage can be supplied to each of first reference electrode 202 and second reference electrode 204, and a first reference capacitance between the first reference electrode and the second reference electrode can be measured as described herein. The first reference capacitance can be used to control liquid lens 100 also as described herein.

In some embodiments, first reference electrode pair 200 comprises a first reference lead 206 electrically coupled to first reference electrode 202 and a second reference lead 208 electrically coupled to second reference electrode 204. In some embodiments, liquid lens 100 comprises a reference cutout 210. Reference cutout 210 can be configured substantially as described herein in reference to cutouts 136, except that the reference cutout comprises a scribe 130 that electrically isolates the reference cutout from common electrode 124 and/or a bulk of conductive layer 128. In some embodiments, reference cutout 210 is segmented into a first reference cutout segment 210A and a second reference cutout segment 210B. For example, first reference cutout segment 210A and second reference cutout segment 210B are isolated from each other by a scribe 130. In some embodiments, first reference lead 206 is electrically coupled to first reference cutout segment 210A. Additionally, or alternatively, second reference lead 208 is electrically coupled to second reference cutout segment 210B. Thus, first reference cutout segment 210A can enable electrical connection to first reference electrode 202 and/or second reference cutout segment 210B can enable electrical connection to second reference electrode 204 to enable the reference voltages to be supplied to the reference electrodes and/or the first reference capacitance to be measured as described herein.

In some embodiments, first reference electrode pair 200 is insulated from first liquid 106. For example, liquid lens 100 comprises an insulating patch 212 that substantially covers first reference electrode pair 200. Insulating patch 212 can be formed from the same or a different material as insulating layer 132. Additionally, or alternatively, insulating patch 212 can be integral with or separate from insulating layer 132. In some embodiments, insulating patch 212 extends outward beyond bond 134A such that the insulating patch extends outside of cavity 104, which can help to prevent electrical communication between first reference electrode pair 200 and first liquid 106.

Figure 5:
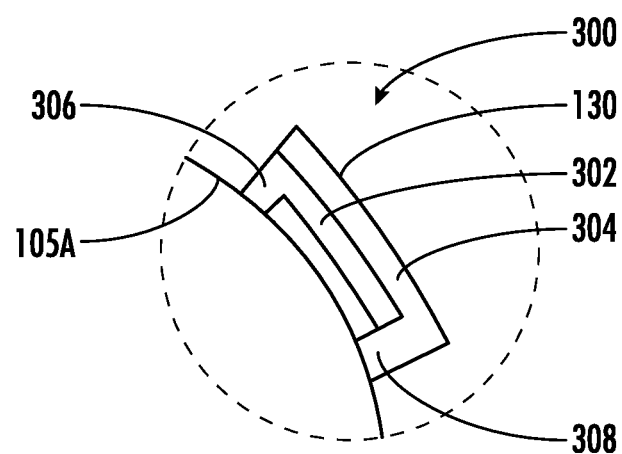
FIG. 5 is a close-up view of some embodiments of a second reference electrode pair.

In some embodiments, liquid lens 100 comprises a second reference electrode pair 300 disposed within second portion 104B of cavity 104 and insulated from first liquid 106 and second liquid 108. FIG. 5 is a close-up view of some embodiments of second reference electrode pair 300. In some embodiments, second reference electrode pair 300 comprises a first reference electrode 302 and a second reference electrode 304. For example, first reference electrode 302 and second reference electrode 304 are elongate conductive members positioned substantially parallel to each other and spaced from each other. First reference electrode 302 and second reference electrode 304 can be configured generally as described herein in reference to first reference electrode 202 and second reference electrode 204. In some embodiments, first reference electrode 302 and second reference electrode 304 are defined by one or more scribe lines 130 in conductive layer 128. For example, scribe lines 130 can be formed in driving electrode 126 to serve as gaps to isolate first reference electrode 302 and second reference electrode 304 from each other and/or from driving electrode 126. Thus, a portion of driving electrode 126 can be isolated or carved out to form second reference electrode pair 300. A reference voltage can be supplied to each of first reference electrode 302 and second reference electrode 304, and a second reference capacitance between the first reference electrode and the second reference electrode can be measured as described herein. The second reference capacitance can be used to control liquid lens 100 also as described herein.

In some embodiments, driving electrode 126 is segmented into a plurality of driving electrode segments as described herein. In some of such embodiments, second reference electrode pair 300 can be formed in any one of the driving electrode segments. Additionally, or alternatively, second reference electrode pair 300 can comprise a plurality of second reference electrode pairs disposed in a corresponding plurality of the driving electrode segments. For example, in some embodiments, the liquid lens comprises four second reference electrode pairs, and each of the four reference electrode pairs is formed in a corresponding one of the four driving electrode segments. Such a configuration can enable determination of a reference capacitance corresponding to each segment (e.g., each quadrant) of the cavity corresponding to each driving electrode segment.

In some embodiments, second reference electrode pair 300 comprises a first reference lead 306 electrically coupled to first reference electrode 302 and a second reference lead 308 electrically coupled to second reference electrode 304. In some embodiments, liquid lens 100 comprises a first reference cutout 310A and a second reference cutout 310B as shown in FIG. 3. Reference cutouts 310 can be configured substantially as described herein in reference to cutouts 136, except that the reference cutouts comprise a scribe 130 that electrically isolates the reference cutouts from driving electrode 126 and/or a bulk of conductive layer 128. In some embodiments, first reference lead 306 is electrically coupled to first reference cutout 310A. Additionally, or alternatively, second reference lead 308 is electrically coupled to second reference cutout 310B. Thus, first reference cutout 310A can enable electrical connection to first reference electrode 302 and/or second reference cutout 310B can enable electrical connection to second reference electrode 304 to enable the reference voltages to be supplied to the reference electrodes and/or the second reference capacitance to be measured as described herein.

Although reference cutout 210 is described herein as comprising reference cutout segments 210A and 210B, other embodiments are included in this disclosure. In other embodiments, the reference cutout can comprise a plurality of independent reference cutouts (e.g., as described herein in reference to reference cutouts 310A and 310B). Although reference cutouts 310 are described herein as comprising reference cutouts 310A and 310B, other embodiments are included in this disclosure. In other embodiments, the reference cutout can comprise a single reference cutout comprising a plurality of reference cutout segments (e.g., as described herein in reference to reference cutout segments 210A and 210B).

Figure 6:
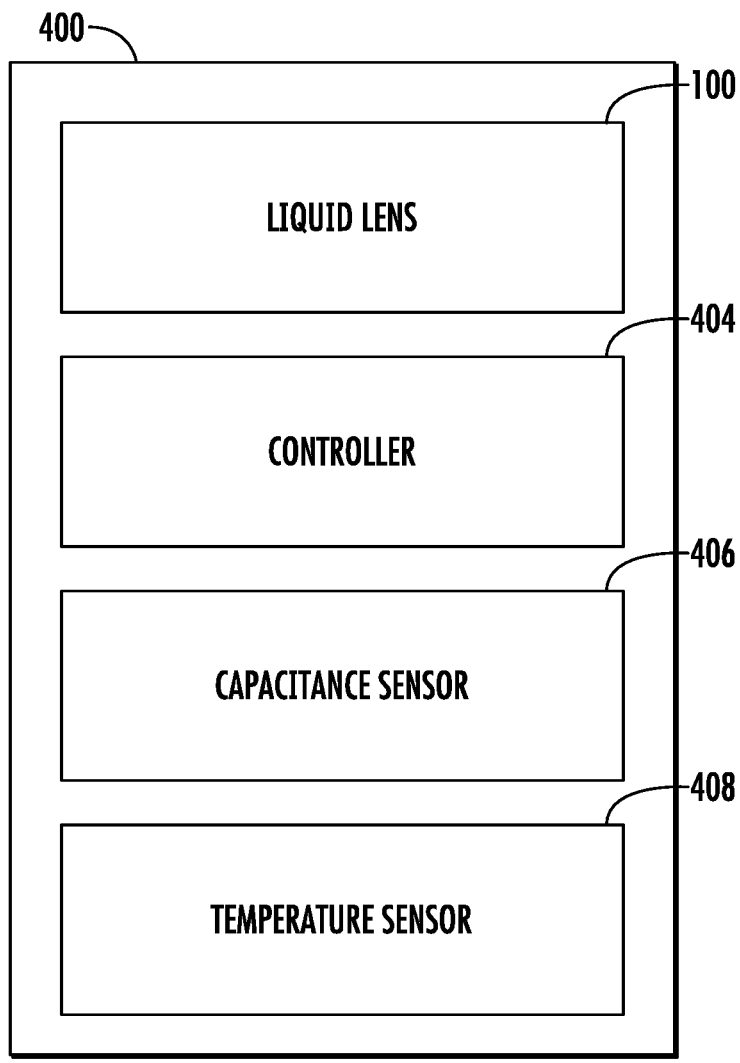
FIG. 6 is a block diagram illustrating some embodiments of a liquid lens system.

FIG. 6 is a block diagram illustrating some embodiments of a liquid lens system 400. In some embodiments, liquid lens system 400 comprises liquid lens 100. In some embodiments, liquid lens system 400 comprises a controller 404. Controller 404 can be configured to supply a common voltage to common electrode 124 of liquid lens 100 and a driving voltage to driving electrode 126 of the liquid lens. A shape of interface 110 of liquid lens 100 and/or a position of the interface of the liquid lens can be controlled by the voltage differential between the common voltage and the driving voltage. In some embodiments, the common voltage and/or the driving voltage comprises an oscillating voltage signal (e.g., a square wave, a sine wave, a triangle wave, a sawtooth wave, or another oscillating voltage signal). In some of such embodiments, the voltage differential between the common voltage and the driving voltage comprises a root mean square (RMS) voltage differential. Additionally, or alternatively, the voltage differential between the common voltage and the driving voltage is manipulated using pulse width modulation (e.g., by manipulating a duty cycle of the differential voltage signal). In some embodiments, the voltage differential between the common voltage and the driving voltage is based at least in part on at least one of (a) the first reference capacitance of first reference electrode pair 200 or (b) the second reference capacitance of second reference electrode pair 300. For example, in some embodiments, the voltage differential between the common voltage and the driving voltage is based at least in part on both (a) the first reference capacitance of first reference electrode pair 200 and (b) the second reference capacitance of second reference electrode pair 300. Determining the voltage differential between the common voltage and the driving voltage based on the first reference capacitance and/or the second reference capacitance can enable the liquid lens system to compensate for changes in the electrical properties of the liquid lens over time. In some embodiments, the voltage differential between the common voltage and the driving voltage is based at least in part on (c) a capacitance between first liquid 106 and driving electrode 126, which can be indicative of the position of interface 110 on the sidewall of cavity 104.

In some embodiments, driving electrode 126 comprises a plurality of driving electrode segments as described herein. In some of such embodiments, the voltage differential between the common voltage and the driving voltage supplied to each of the plurality of driving electrode segments is based at least in part on (a) the first reference capacitance of first reference electrode pair 200, (b) the second reference capacitance of second reference electrode pair 300, and/or (c) a capacitance between first liquid 106 and the respective driving electrode segment. For example, a driving voltage supplied to the driving electrode, a second driving voltage supplied to the second driving electrode, a third driving voltage supplied to the third driving electrode, and a fourth driving voltage supplied to the fourth driving electrode are the same as or different than each other, a voltage differential between the common voltage and the driving voltage is based at least in part on at least one of (a) the first reference capacitance of the first reference electrode pair or (b) the second reference capacitance of the second reference electrode pair, a second voltage differential between the common voltage and the second driving voltage is based at least in part on at least one of (a) the first reference capacitance of the first reference electrode pair or (b) the second reference capacitance of the second reference electrode pair, a third voltage differential between the common voltage and the third driving voltage is based at least in part on at least one of (a) the first reference capacitance or (b) the second reference capacitance, and a fourth voltage differential between the common voltage and the fourth driving voltage is based at least in part on at least one of (a) the first reference capacitance or (b) the second reference capacitance.

In some embodiments, controller 404 is configured to supply a first reference voltage to each of first reference electrode 202 of first reference electrode pair 200 and second reference electrode 204 of the first reference electrode pair. For example, the first reference voltage supplied to first reference electrode 202 of first reference electrode pair 200 is substantially the same as the first reference voltage supplied to second reference electrode 204 of the first reference electrode pair. Supplying the same reference voltage to each reference electrode of the first reference electrode pair can enable detection of the first reference capacitance between the adjacent, spaced electrodes to use in determining the voltage differential between the common voltage and the driving voltage as described herein.

In some embodiments, controller 404 is configured to supply a second reference voltage to each of first reference electrode 302 of second reference electrode pair 300 and second reference electrode 304 of the second reference electrode pair. For example, the second reference voltage supplied to first reference electrode 302 of second reference electrode pair 300 is substantially the same as the second reference voltage supplied to second reference electrode 304 of the second reference electrode pair. Supplying the same reference voltage to each reference electrode of the second reference electrode pair can enable detection of the second reference capacitance between the adjacent, spaced electrodes to use in determining the voltage differential between the common voltage and the driving voltage as described herein.

In some embodiments, liquid lens system 400 comprises a capacitance sensor 406 configured to measure the first reference capacitance, the second reference capacitance, and/or the capacitance between first liquid 106 and driving electrode 126. In some embodiments, controller 404 is configured to determine the voltage differential between the common voltage and the driving voltage based at least in part on a capacitance signal received from the capacitance sensor. For example, the capacitance signal is indicative of the measured first reference capacitance, second reference capacitance, and/or capacitance between first liquid 106 and driving electrode 126.

In some embodiments, liquid lens system 400 comprises a temperature sensor 408. For example, temperature sensor 408 is disposed within cavity 104 and/or configured to measure a temperature within the cavity. In some embodiments, the voltage differential between the common voltage and the driving voltage is based at least in part on a temperature signal generated by the temperature sensor, which can enable compensation for changing electrical properties and/or physical properties of the liquid lens with changes in temperature.

In various embodiments, controller 404 can comprise one or more of a general processor, a digital signal processor, an application specific integrated circuit, a field programmable gate array, an analog circuit, a digital circuit, a server processor, combinations thereof, or other now known or later developed processor. Controller 404 can implement one or more of various processing strategies, such as multi-processing, multi-tasking, parallel processing, remote processing, centralized processing, or the like. Controller 404 can be responsive to or operable to execute instructions stored as part of software, hardware, integrated circuits, firmware, microcode, or the like.

In some embodiments, a method of operating a liquid lens comprises supplying a common voltage to common electrode 124 in electrical communication with first liquid 106 and supplying a driving voltage to driving electrode 126 disposed on a sidewall of cavity 104. In some embodiments, the method comprises supplying a first reference voltage to each of first reference electrode 202 of first reference electrode pair 200 and second reference electrode 204 of the first reference electrode pair. In some embodiments, the first reference voltage supplied to first reference electrode 202 is substantially the same as the first reference voltage supplied to second reference electrode 204. Additionally, or alternatively, the method comprises supplying a second reference voltage to each of first reference electrode 302 of second reference electrode pair 300 and second reference electrode 304 of the second reference electrode pair. In some embodiments, the second reference voltage supplied to first reference electrode 302 is substantially the same as the second reference voltage supplied to second reference electrode 304. In some embodiments, the method comprises determining a first reference capacitance between first reference electrode 202 and second reference electrode 204. Additionally, or alternatively, the method comprises determining a second reference capacitance between first reference electrode 302 and second reference electrode 304. In some embodiments, the method comprises adjusting a voltage differential between the common voltage and the driving voltage based at least in part on (a) the first reference capacitance and/or (b) the second reference capacitance. Additionally, or alternatively, the method comprises determining a capacitance between first liquid 106 and driving electrode 126 and adjusting the voltage differential between the common voltage and the driving voltage based at least in part on the capacitance between the first liquid and the driving electrode. Additionally, or alternatively, the method comprises determining a temperature within the cavity and adjusting the voltage differential between the common voltage and the driving voltage based at least in part on the temperature within the cavity.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A liquid lens system comprising:
   a first window, a second window, and a cavity disposed between the first window and the second window;
   a first liquid and a second liquid disposed within the cavity, the first liquid and the second liquid substantially immiscible with each other and having different refractive indices such that an interface between the first liquid and the second liquid defines a variable lens, at least a portion of the first liquid disposed within a first portion of the cavity, the second liquid disposed within a second portion of the cavity;
   a common electrode in electrical communication with the first liquid;
   a driving electrode disposed on a sidewall of the cavity and insulated from the first liquid and the second liquid; and
   a controller configured to supply a common voltage to the common electrode and a driving voltage to the driving electrode;
   wherein a voltage differential between the common voltage and the driving voltage is based at least in part on at least one of:
   (a) a first reference capacitance of a first reference electrode pair disposed within the first portion of the cavity and insulated from the first liquid, the controller being configured to supply a first reference voltage to each of a first reference electrode of the first reference electrode pair and a second reference electrode of the first reference electrode pair, wherein the first reference voltage being supplied to the first reference electrode of the first reference electrode pair is substantially the same as the first reference voltage being supplied to the second reference electrode of the first reference electrode pair; or
   (b) a second reference capacitance of a second reference electrode pair disposed within the second portion of the cavity and insulated from the first liquid and the second liquid, the controller being configured to supply a second reference voltage to each of a first reference electrode of the second reference electrode pair and a second reference electrode of the second reference electrode pair, wherein the second reference voltage being supplied to the first reference electrode of the second reference electrode pair is substantially the same as the second reference voltage being supplied to the second reference electrode of the second reference electrode pair.

2. The liquid lens system of claim 1, wherein the voltage differential between the common voltage and the driving voltage is based at least in part on (c) a capacitance between the first liquid and the driving electrode.

3. The liquid lens system of claim 1, wherein the voltage differential between the common voltage and the driving voltage is based at least in part on both:
   (a) the first reference capacitance of the first reference electrode pair and
   (b) the second reference capacitance of the second reference electrode pair.

4. The liquid lens system of claim 1, comprising a capacitance sensor configured to measure the at least one of (a) the first reference capacitance of the first reference electrode pair or (b) the second reference capacitance of the second reference electrode pair;
   wherein the controller is configured to determine the voltage differential between the common voltage and the driving voltage based at least in part on a capacitance signal received from the capacitance sensor.

5. The liquid lens system of claim 1, comprising a temperature sensor disposed within the cavity;
   wherein the voltage differential between the common voltage and the driving voltage is based at least in part on (d) a temperature signal generated by the temperature sensor.

6. The liquid lens system of claim 1, comprising an insulating patch disposed within the cavity and covering the first reference electrode pair to insulate the first reference electrode pair from the first liquid.

7. The liquid lens system of claim 1, comprising an insulating layer disposed within the cavity and at least partially covering the at least one driving electrode to insulate the at least one driving electrode from the first liquid and the second liquid.

8. The liquid lens system of claim 7, wherein a position of a perimeter of the interface between the first liquid and the second liquid on the insulating layer is adjustable based at least in part on the voltage differential between the common voltage and the driving voltage to vary an optical power of the variable lens.

9. The liquid lens system of claim 1, comprising a conductive layer disposed within the first portion of the cavity to define the common electrode and a scribe in the conductive layer to separate a first reference electrode of the first reference electrode pair and a second reference electrode of the first reference electrode pair from the common electrode.

10. The liquid lens system of claim 1, comprising a conductive layer disposed on the sidewall of the cavity to define the driving electrode and a scribe in the conductive layer to separate a first reference electrode of the second reference electrode pair and a second reference electrode of the second reference electrode pair from the driving electrode.

11. A method of operating a liquid lens, the method comprising:
supplying a common voltage to a common electrode in electrical communication with a first liquid, the first liquid and a second liquid disposed within a cavity, substantially immiscible with each other, and having different refractive indices such that an interface between the first liquid and the second liquid defines a variable lens, at least a portion of the first liquid disposed within a first portion of the cavity, the second liquid disposed within a second portion of the cavity;
supplying a driving voltage to a driving electrode disposed on a sidewall of the cavity;
supplying a first reference voltage to each of a first reference electrode of a first reference electrode pair and a second reference electrode of the first reference electrode pair, the first reference electrode pair disposed within the first portion of the cavity and insulated from the first liquid, the first reference voltage supplied to the first reference electrode of the first reference electrode pair substantially the same as the first reference voltage supplied to the second reference electrode of the first reference electrode pair, wherein to enable detection of the first reference capacitance between the adjacent, spaced electrodes are used in determining the voltage differential between the common voltage and the driving voltage;
supplying a second reference voltage to each of a first reference electrode of a second reference electrode pair and a second reference electrode of the second reference electrode pair, the second reference electrode pair disposed within the second portion of the cavity and insulated from the first liquid and the second liquid, the second reference voltage supplied to the first reference electrode of the second reference electrode pair substantially the same as the second reference voltage supplied to the second reference electrode of the second reference electrode pair, wherein to enable detection of the first reference capacitance between the adjacent, spaced electrodes are used in determining the voltage differential between the common voltage and the driving voltage;
determining a first reference capacitance between the first reference electrode of the first reference electrode pair and the second reference electrode of the first reference electrode pair;
determining a second reference capacitance between the first reference electrode of the second reference electrode pair and the second reference electrode of the second reference electrode pair; and
adjusting a voltage differential between the common voltage and the driving voltage based at least in part on (a) the first reference capacitance and (b) the second reference capacitance to move the fluid interface to a desired position.

12. The method of claim 11, comprising:
determining a capacitance between the first liquid and the driving electrode; and
adjusting the voltage differential between the common voltage and the driving voltage based at least in part on (c) the capacitance between the first liquid and the driving electrode.

13. The method of claim 11, comprising:
determining a temperature within the cavity; and
adjusting the voltage differential between the common voltage and the driving voltage based at least in part on (d) the temperature within the cavity.

* * * * *